(12) United States Patent
Brunner et al.

(10) Patent No.: US 11,298,852 B2
(45) Date of Patent: Apr. 12, 2022

(54) DEVICE AND METHOD FOR PRODUCING REACTION PLASTICS

(71) Applicant: KRAUSSMAFFEI TECHNOLOGIES GMBH, Munich (DE)

(72) Inventors: Robert Brunner, Augsburg (DE); Thomas Nowak, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/270,347

(22) PCT Filed: Oct. 31, 2018

(86) PCT No.: PCT/EP2018/079807
§ 371 (c)(1),
(2) Date: Feb. 22, 2021

(87) PCT Pub. No.: WO2020/048624
PCT Pub. Date: Mar. 12, 2020

(65) Prior Publication Data
US 2021/0308907 A1    Oct. 7, 2021

(30) Foreign Application Priority Data

Sep. 7, 2018   (DE) ..................... 10 2018 121 890.7

(51) Int. Cl.
*B29B 7/00* (2006.01)
*B29B 7/60* (2006.01)
(Continued)

(52) U.S. Cl.
CPC .............. *B29B 7/603* (2013.01); *B01F 35/71* (2022.01); *B29B 7/7409* (2013.01);
(Continued)

(58) Field of Classification Search
CPC ..... B29B 7/603; B29B 7/7409; B29B 7/7433; B29B 7/7626; B01F 15/02; B01F 15/0201;
(Continued)

(56) References Cited

U.S. PATENT DOCUMENTS 3,306,495 A    2/1967   Wabers
3,765,605 A *  10/1973  Gusmer ................ B29B 7/7626
                                                    239/61

(Continued)

FOREIGN PATENT DOCUMENTS

DE    2914684 A1    4/1981
DE    4003294 A1    8/1991
(Continued)

OTHER PUBLICATIONS

International Search Report for PCT/EP2018/079807 dated Apr. 16, 2019 and translation thereof.
Written Opinion for PCT/EP2018/079807 dated Apr. 16, 2019.

*Primary Examiner* — Anshu Bhatia
(74) *Attorney, Agent, or Firm* — Pearne & Gordon LLP

(57) ABSTRACT

A device and a method for producing reaction plastics, including a first metering device with a first metering unit and a second metering unit, each of which is suitable for receiving and dispensing a first mixing component in a metered manner, a second metering device which is suitable for receiving and dispensing a second mixing component in a metered manner, and a mixing device which is suitable for receiving and mixing the first mixing component dispensed by the first metering unit and/or the second metering unit of the first metering device and the second mixing component dispensed by the second metering device. For this purpose the first metering unit and the second metering unit are connected to the mixing device such that prior to beginning the mixing process, the first mixing component can be (Continued)

brought to an operating state required for the mixing process, in particular an operating pressure, by guiding the first mixing component from the first metering unit to the second metering unit via the mixing device.

11 Claims, 3 Drawing Sheets

(51) Int. Cl.
| | | |
|---|---|---|
| *B29B 7/74* | (2006.01) | |
| *B29B 7/76* | (2006.01) | |
| *B67D 3/00* | (2006.01) | |
| *C08J 3/00* | (2006.01) | |
| *C08K 3/04* | (2006.01) | |
| *C08K 3/40* | (2006.01) | |
| *B01F 35/71* | (2022.01) | |
| *B01F 101/00* | (2022.01) | |

(52) U.S. Cl.
CPC .......... *B29B 7/7433* (2013.01); *B29B 7/7626* (2013.01); *B67D 3/00* (2013.01); *B67D 3/0012* (2013.01); *C08J 3/005* (2013.01); *C08K 3/04* (2013.01); *C08K 3/40* (2013.01); *B01F 2101/2805* (2022.01); *C08J 2205/026* (2013.01); *C08J 2367/04* (2013.01); *C08J 2371/08* (2013.01); *C08J 2375/04* (2013.01)

(58) Field of Classification Search
CPC . B01F 2215/0049; B67D 3/00; B67D 3/0012; C08J 3/005; C08K 3/04; C08K 3/40
See application file for complete search history.

(56) References Cited

U.S. PATENT DOCUMENTS

| | | | |
|---|---|---|---|
| 3,912,234 | A * | 10/1975 | Peter .................... G05D 11/132 366/262 |
| 6,538,040 | B1 | 3/2003 | Okuda et al. |
| 10,618,198 | B2 | 4/2020 | Kukla et al. |
| 2016/0102658 | A1 | 4/2016 | Wichmann |
| 2018/0169899 | A1 | 6/2018 | Renkl |

FOREIGN PATENT DOCUMENTS

| | | |
|---|---|---|
| DE | 3917207 A1 | 11/1991 |
| DE | 202015009025 U1 | 7/2016 |
| DE | 102016114898 A1 | 2/2018 |
| GB | 2488125 A | 8/2012 |
| WO | 9615890 A1 | 5/1996 |
| WO | 2014195312 A1 | 12/2014 |

* cited by examiner

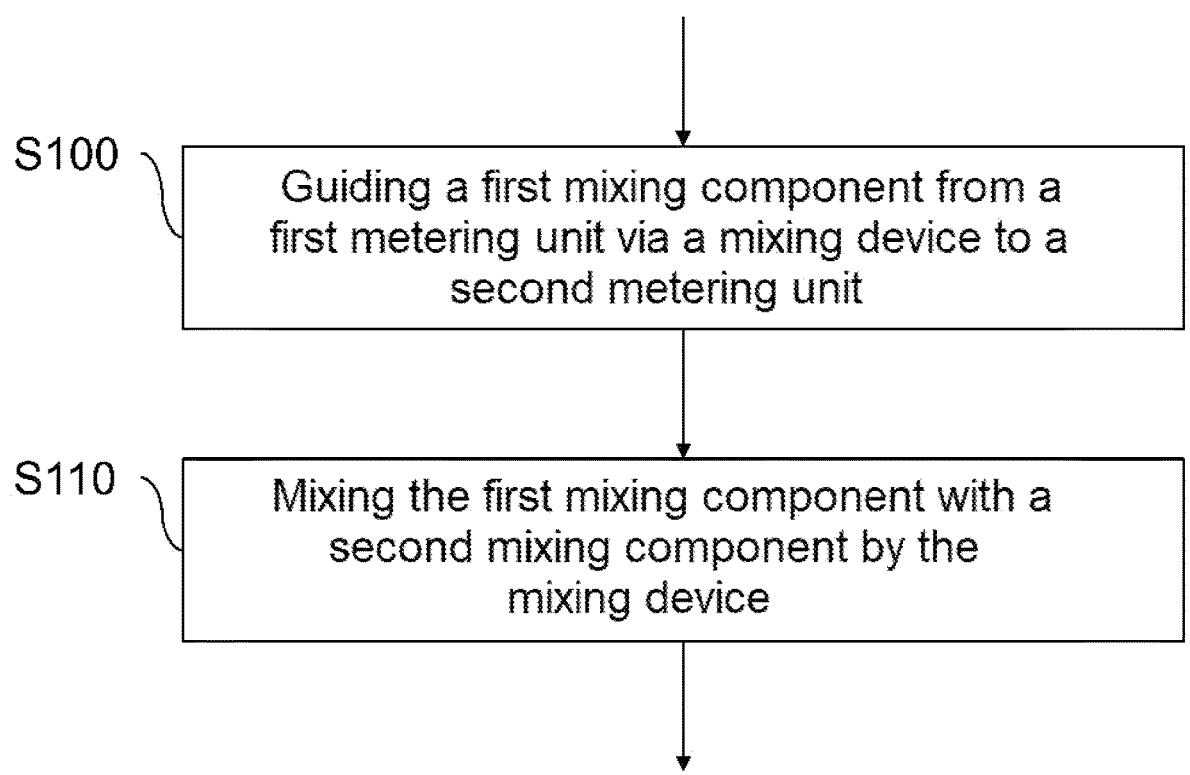

DEVICE AND METHOD FOR PRODUCING REACTION PLASTICS

CROSS-REFERENCE TO RELATED APPLICATIONS

This is a National Stage application of PCT international application PCT/EP2018/079807 filed on Oct. 31, 2018, which claims the priority of German Patent Application No. 10 2018 121 890.7, filed Sep. 7, 2018, which are incorporated herein by reference in their entireties.

FIELD OF THE INVENTION

The present invention relates to a device and a method for mixing and producing reaction plastics, in particular for producing polyurethane foams from isocyanate and polyol mixed with flame retardant, such as expanded graphite for example.

BACKGROUND OF THE INVENTION

In the production of reaction plastics (or respectively reactive plastics), usually the individual components of the plastic, i.e. the reactive components, are moved in a circuit in processing machines from storage containers with an agitator via metering pumps or pistons to a mixing head and from there back to the storage container, in order e.g. to prevent sedimentation, to maintain as constant a temperature as possible in the system or in order to set a stable pressure level at the nozzles of the mixing head.

Against this background, DE 40 03 294 A1 describes a circuit block for mixing heads, in particular parallel nozzle heads, for a polyurethane foam system. DE 10 2016 114 898 A1 relates to a device for the foaming of a viscous material, wherein the viscous material is conveyed with a first conveying device at a first conveying pressure through a first conveying line, and wherein a gas under a second conveying pressure is conveyed through a second conveying line, and wherein the second conveying line opens at an opening site into the first conveying line, and wherein downstream of the opening site an outflow device is provided for the pressure-relieving outflowing of the mixture of viscous material and gas, wherein at the opening site a gas injection valve is arranged, wherein the gas injection valve can inject gas bubbles into the viscous material.

Without the circuit, described above, between storage container and mixing head, DE 29 14 684 A1 already describes a method for the continuous mixing and metering of two reactive viscous media, still without the circuit which is described above. U.S. Pat. No. 3,765,605 A also describes a corresponding device, wherein two fluids, reacting with one another, such as the components of a polyurethane foam, are mixed together and by means of the device, which pumps the fluids separately and only mixes them at the last moment, are ejected onto a substrate. By reorganizing the pumps in opposed relationship and driving by a constant pressure motor such as a double-acting fluid motor, a compensation effect is produced, which effectively reduces the pressure fluctuation when the stroke action reverses.

A disadvantage here is that solids, such as e.g. flame retardants (in particular expanded graphite), micro glass beads, aerogels or suchlike which are added for characteristics modification of the reactive system, are increasingly damaged in the continuous circuit operation in the container agitator, in the pumps and/or in the nozzles of the mixing head. Hereby, a uniform product quality can no longer be guaranteed. In particular, through damage to the solid material through fragmentation chemicals stored therein can be released, which impair the reactive system. In addition, through a circuit operation, a too long-lasting stay of the solids in the system can be brought about, which leads to a chemical reaction of the solids before the actual mixing.

BRIEF SUMMARY OF THE INVENTION

It is an object of the invention to solve the problems which are described above. In particular, a device and a method for producing reaction plastics is to be indicated, by which it is possible, with the addition of solids to a mixing component, to produce plastics with a uniformly high quality.

This problem is solved by the subject matter of the independent claims. Advantageous further developments are indicated in the dependent claims.

A device for mixing reactive plastics has a first metering device with a first metering unit and a second metering unit, each of which are suitable for receiving and for dispensing in a metered manner a first mixing component. Furthermore, the device has a second metering device, which is suitable for receiving and dispensing in a metered manner a second mixing component, and a mixing device which is suitable for receiving and mixing the first mixing component dispensed by the first metering unit and/or the second metering unit of the first metering device and the second mixing component dispensed by the second metering device. For this purpose the first metering unit and the second metering unit are connected to the mixing device such that prior to beginning the mixing process, the first mixing component can be brought to an operating state (pressure, temperature, viscosity or suchlike), required for the mixing process, in particular an operating pressure, by guiding the first mixing component from the first metering unit to the second metering unit via the mixing device.

In the circuit operation which is usually used, prior to beginning the mixing process, the first mixing component, which is mixed with a solid, is circulated from a storage container via a metering device to the mixing device and back to the storage container, until the desired operating state of the first mixing component is reached. In contrast hereto, in the device described above, a circuit operation is dispensed with.

Instead, two metering units are provided, between which the first mixing component is guided, until the desired operating state is reached. In particular, a pressure required for the production of reaction plastics, e.g. in the range of 100 to 200 bar, can be generated by a pressing of the first mixing component from the one metering unit into the other metering unit in a relatively short period of time, e.g. in a few seconds, i.e. for instance in 0.5, 1.5 or 2 seconds, wherein the mixing device, for instance a mixing nozzle known per se, is interposed. For example, the processing pressure occurs when the reactive component mixture is moved through a nozzle in a mixing head of the mixing device. The pressure can occur on reaching the intended delivery rate, which, depending on the acceleration of the mixing components towards the mixing device, lasts ca. one second. When the desired operating state is reached, which owing to the guiding through the mixing device also prevails therein, the mixing can be commenced, without waste occurring due to faulty operating states, such as for instance a mixing pressure which is too low.

The amount of the first mixing component received in the one metering unit is typically not impaired in its quality on the single passage through the mixing device. Therefore, after the mixing has commenced, it can be delivered to the mixing device for mixing with an amount of the first mixing component which is already situated in the receiving metering unit.

Therefore, a returning of material in a circuit operation can be entirely dispensed with. This enables on the one hand a simple construction of the device, which nevertheless permits the exact setting of operating states of the first mixing component, such as pressure, temperature, viscosity or suchlike. On the other hand, if applicable, solids contained in the first mixing component are not damaged by the single passage through the mixing device such that a reduction in the quality of the plastic occurs which is produced by the mixing. By collecting this quantity of the first mixing component, passing through once, in a metering unit, it is ensured in addition that no waste of first mixing component occurs, but rather that this is processed as completely as possible.

Furthermore, the device can have a dispensing device, which has a storage container and is suitable for the selective delivering of the first mixing component to the first metering unit and/or to the second metering unit. Here, the first mixing component, after it has been delivered to the first metering unit and/or to the second metering unit, can be mixed in the mixing device with the second mixing component, without being guided back into the dispensing device. This makes it possible to produce the two metering units with the first mixing component in a simple manner. A directing back to a storage container is not necessary, whereby the material which is added to the first mixing component is conserved and the structure of the device is simplified.

The mixing device can have control means which are suitable for preventing a mixing of first mixing component and second mixing component and to guide the first mixing component here in a line from the first metering unit via the mixing device to the second metering unit. In addition, the control means can be suitable to enable a mixing of first mixing component and second mixing component and to interrupt here the line in the mixing device leading from the first metering unit via the mixing device to the second metering unit.

Hereby, in a simple manner, the mixing of first mixing component and second mixing component can be controlled. It is ensured in particular that during the mixing, the first mixing component is delivered entirely to the mixing process and is not transferred from one metering unit into the other metering unit. This permits a precise setting of the ratio of amounts of first and second mixing component which are used for the mixing process.

The control means can have a control piston with a circulation groove, which in a first position enables an entry of the first mixing component and of the second mixing component into a mixing chamber, and in a second position guides the first mixing component via the circulation groove from the first metering unit to the second metering unit. This guarantees, with a closed control piston, a simple and secure transfer of the first mixing component between the metering units. By opening the control piston, this line is interrupted and an entry of the first mixing component into a mixing chamber, for instance of a mixing nozzle, is enabled. This then takes place precisely with the operating parameters which were set before opening of the control piston. With the opening of the control piston, the access of the second mixing component into the mixing chamber is then also enabled.

The first metering unit can have a first container, the second metering unit can have a second container and, before the start of the mixing, the first mixing component can be pressed from the first container into the second container, in order to reach the operating state. The provision of containers, provided for the intermediate storage, in the metering units makes possible a flexible and precise metering of the first mixing component.

For example, at the start of the mixing method, the first container can be completely filled, whereas the second container is only partially filled, e.g. halfway. Before the start of the mixing, the first mixing component is transferred in an exactly metered manner from the first container via the mixing device into the second container. The volume available to the first mixing component in the second container can remain constant here for setting the operating state, for instance of pressure or temperature, or can be varied. After the desired operating state is reached, the mixing is enabled and e.g. a constant mass flow of first mixing component is conveyed out of the first container into the mixing device. With increasing emptying or after the complete emptying of the first container, a conveying begins also or respectively exclusively from the second container, without altering the quantity ratio or respectively volume ratio of first and second mixing component.

This ensures that the quantity of first mixing component passing once through the mixing device can be delivered without further damaging impairment to the mixture.

The first metering device can be suitable for dispensing to the mixing device the first mixing component, after the start of mixing, alternately or on the fly through the first metering unit and the second metering unit. While a conveying of first mixing component takes place from the one metering unit, therefore the other metering unit itself is filled with the first mixing component. This allows greater quantities of reaction plastic to be produced, without interrupting the mixing process and without holding a quantity of the first mixing component, corresponding to the quantity of reaction plastic, in one of the metering units.

Thereby, the metering units can be configured in a spatially compact manner, which permits on the one hand a flexible positioning of the metering units, and on the other hand prevents a greater quantity of the first mixing components remaining in one of the metering units over a longer period of time, which could lead to an impairment of the quality of the mixing component.

The first mixing component can have a polyol, mixed with a solid, in particular expanded graphite, micro glass beads or aerogel, in particular polyester polyol or polyether polyol, and the second mixing component can have an isocyanate. With a corresponding equipping, the device is suitable for producing polyurethane, which owing to addition of solids has particular characteristics. For example, through the addition of expanded graphite, the production of polyurethane foams is made possible, which are extremely difficultly flammable and which thus meet the highest fire protection regulations. Such polyurethane foams can be used e.g. as soundproofing parts. In addition to the solids, the mixing components can be provided with various further additives. For example, a further pulverulent flame retardant can also be added to the polyol which is mixed with expanded graphite. It is self-evident that in addition to polyol and isocyanate, other reactive components can also be used, which are suitable for the production of reactive plastics.

With the use of a mixture of polyol with expanded graphite as first mixing component, the use of the device described above is particularly advantageous. As polyols concern bases, whereas expanded graphite constitutes an acid, the first mixing component must be processed within a short time, e.g. within one to two hours, in order to be able to guarantee the desired characteristics of the polyurethane. Storing in a day container which is used in a conventional manner with circulation is not possible here. In addition, a wearing of the expanded graphite in a circulation process would quickly lead to the desired characteristics of the polyurethane which is to be produced being no longer able to be guaranteed. Precisely the use of polyol and expanded graphite as first mixing component therefore require the use of a device as was described above.

The first metering unit and the second metering unit can have respectively a metering piston with a drive by spindle and nut and a servomotor. This allows the first mixing component to be discharged in exact metering out of the metering units. In particular, in this way with respect to the occurring forces a good practicability and a good controllability can be achieved. Alternatively, the metering units can also be provided with other electronic drives suitable for this, or else hydraulic or pneumatic drives for the dispensing of the mixing components.

The mixing device can have a feed line for feeding the first mixing component into the mixing device, and a discharge for discharging the first mixing component out of the mixing device. Here, the first metering unit can be connected via a first valve with the feed line, and via a second valve with the discharge, and the second metering unit can be connected via a third valve with the feed line and via a fourth valve with the discharge. The valves can be opened and closed independently of one another. This allows the first mixing component to be transferred, according to requirements, between the two metering units and the mixing device. Hereby, a flexible operation of the device is guaranteed.

A volume of the first mixing component, which can be received in the first metering unit and/or in the second metering unit, can be greater than a volume of the first mixing component which can be received through lines which lead from the first metering unit and/or from the second metering unit to the mixing device.

Thereby, it is ensured that the quantity of the first mixing component, which has not yet been fed to the mixing, is determined substantially through the dimensioning of the metering units and not through the volume of the intermediate lines. This prevents the quality of the produced plastic, despite correct designing of the metering units, being reduced owing to too long a storing of the first mixing component in the lines. In particular, the metering units and the mixing device can be arranged close to one another, e.g. they can be flanged directly to one another or connected with one another through short lines.

The device can have, furthermore, a robot arm, on which the first metering device and the mixing device are arranged. This allows the reaction plastic to be produced in an automated manner. In addition, the arrangement of first metering device and mixing device on the robot arm guarantees that only short line paths lie between these elements. This is advantageous in particular when flexibly smaller forms are to be produced with the reactive plastic, e.g. on a rotary table. As explained above, this contributes to the quality control of the produced plastic. Alternatively, the device can be used without the use of a robot arm on a double belt or suchlike.

A method for producing reaction plastics with a device as was described above can comprise: guiding the first mixing component from the first metering unit via the mixing device to the second metering unit, in order to bring the first mixing component to an operating state required for the mixing process, in particular to an operating pressure; and hereupon mixing the first mixing component and the second mixing component by the mixing device.

The focus of the above description lay on the first metering device. The second metering device can be a metering device known per se with a conventional circulation circuit. Alternatively, however, the second metering device can also be constructed in an analogous manner to the first metering device.

BRIEF DESCRIPTION OF THE DRAWINGS

Further advantageous embodiments of the invention are described below with reference to the figures. It is self-evident that the embodiments described below do not restrict the subject of the invention. The latter is only determined through the subject of the claims. There are shown:

FIG. 3 an illustration of a schematic flow chart of a method for the production of reaction plastics.

DESCRIPTION OF EXAMPLE EMBODIMENTS

Figure 1:
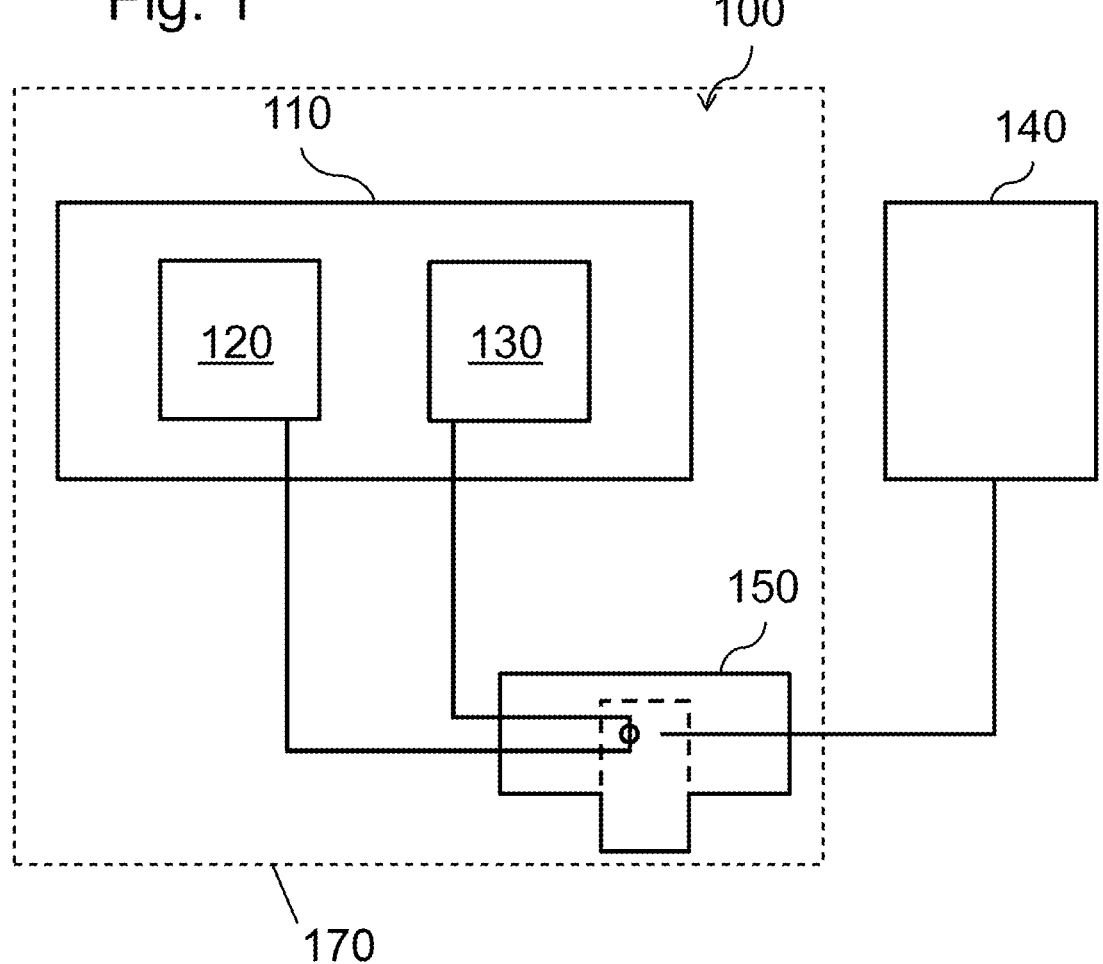
FIG. 1 a schematic illustration of a device for the production of reaction plastics.

In FIG. 1 a device 100 for the production of reaction or respectively reactive plastics by a mixing of mixing components or respectively reactive components is illustrated schematically. The term 'reaction plastic' designates here plastics in the production of which the chemical reaction of at least two mixing components is involved. The device 100 can be used e.g. for the production of reactive plastics, such as for instance polyurethane (foams) of reactive components, such as for instance polyols, e.g. polyester polyol or polyether polyol, and isocyanates.

The device 100 has, as illustrated in FIG. 1, at least two metering devices 110, 140, from which respective mixing components are dispensed to a mixing device 150 in a metered manner via line systems. Although the device is described below with reference to two metering devices 110, 140, and accordingly with reference to two mixing components, it is self-evident that also more than two metering devices or respectively mixing components can be used.

The first metering device 110 has at least a first metering unit 120 and a second metering unit 130. Both metering units 120, 130 are respectively suitable for receiving a first mixing component and for dispensing it, via line systems suitable for this, to the mixing device 150, or respectively to feed the first mixing component to the latter. The naming as first and second metering unit serves here only for clear designation. The first metering unit 120 and the second metering unit 130 can, however, be configured in an entirely exchangeable manner, in particular the two metering units 120, 130 can be identical in construction. In addition, further metering elements, e.g. structurally identical or functioning in an analogous manner, can also be provided in the first metering device 110.

The second metering device 140 is suitable for receiving a second mixing component and for dispensing it to the mixing device 150 in a metered manner. For this, the second metering device 140 can be constructed as is known from the prior art and e.g. can be configured as a high pressure metering pump. However, the second metering device 140 can basically also have a construction corresponding to the first metering device 110. Thereby, the subsequently described advantages of the construction of the first metering device 110 can also be used for the second metering line.

In the following, it is assumed that it is known to a specialist in the art either from the prior art or on the basis of the description of the embodiment of the first metering device 110, how the second metering device 140 must be constructed, in order to be able to feed to the mixing device 150 a mixing component of a reaction plastic, with a particular, predetermined operating state (pressure, temperature, viscosity or suchlike).

The basic configuration of the mixing device 150 is likewise known from the prior art. The mixing device 150 can be constructed e.g. as a mixing nozzle into which, for a mixing process, the mixing components are shot at high pressure, e.g. at 100 bar, 150 bar or 200 bar. Typically, and as known from the prior art, the required operating parameters or states of the mixing components involved can be achieved during a circulation of the mixing components from the (conventional) metering devices, to the mixing nozzle and via storage- or respectively preparation containers of the respective mixing component back to the metering devices. As soon as the operating parameters are reached, the nozzle is opened and the mixing of the mixing components takes place.

This method can, however, no longer be used without the risk of losses of quality if required solids are added to one of the mixing components for the production of specific material characteristics, as these degrade in the course of the circulation. In addition, the circulation entails a long storage duration of the mixing components and, owing to the lines necessary for the returning, an increased complexity of the running of lines.

In particular in the production of difficultly flammable polyurethane foams, for which e.g. an isocyanate is mixed with a polyol, which contains expanded graphite, it is necessary to feed the polyol rapidly, i.e. within one to two hours, to a processing. Otherwise, the risk exists that through premature chemical reaction of the acidic expanded graphite with the basic polyol, the flame retardant characteristics of the expanded graphite are lost, i.e. that the quality of the produced polyurethane foam is reduced. A damage to the expanded graphite in a circulation process would also reduce the flame protection.

In order to circumvent these problems, in the described device 100 a different, improved method is selected for setting the desired operating states, which can be carried out without a circulation of (at least one) mixing component. Alongside its advantages for the production of difficultly flammable polyurethane, the use of the described device 100 is broadly advantageous for the processing of mixing components containing solid bodies. In addition, through the reduced complexity of the required line running, the described construction is also advantageous when no solid bodies are admixed to the mixing components which are used.

In the device 100, the first metering unit 120 and the second metering unit 130 are connected to the mixing device 150 such that prior to beginning the mixing, i.e. before the first mixing component and the second mixing component come in contact and out of the line system of the device 100, the first mixing component is transferred from the first metering unit 120 via the mixing device 150 into the second metering unit 130.

Without an appreciable proportion of the first mixing component being lost, this permits bringing it to the required operating parameters. Namely, as long as no mixing takes place, the first mixing component can be pressed from the one metering device into the other metering device, in order to hereby e.g. increase a pressure prevailing in the first mixing component, whereby also the temperature and the viscosity of the first mixing component can be set.

Only after the required parameters are reached is the mixing begun. As soon as this is the case, through corresponding valves, pumps or suchlike it is ensured that the first mixing component is no longer transferred between the metering units 120, 130, but rather is now fed to the mixing device 150 from one or both metering units 120, 130, e.g. with a constant mass flow. The mixing with the second mixing component, fed from the second metering device, then takes place as is known from the prior art.

Hereby it becomes unnecessary to circulate the first mixing component in the device 100, whereby the construction of the device 100 is simplified. In addition, the first mixing component runs now runs through the mixing device 150 once, without actually being fed to a mixing process. Hereby, a wearing of solids which are subject to wear, such as for instance expanded graphite, micro glass beads, aerogels or suchlike, is prevented. This, in turn, ensures a uniform quality of the produced reaction plastics.

Also, owing to the collecting of the quantity of the first mixing component, dispensed before the mixing operation by the first metering unit 120, in the second metering unit 130, it is ensured that this quantity is not lost in the mixing process, because it can be dispensed from the second metering unit 130 for the mixing process. Despite the lack of circulation, this allows the first mixing component to be used substantially completely for the production of reaction plastics.

Figure 2:
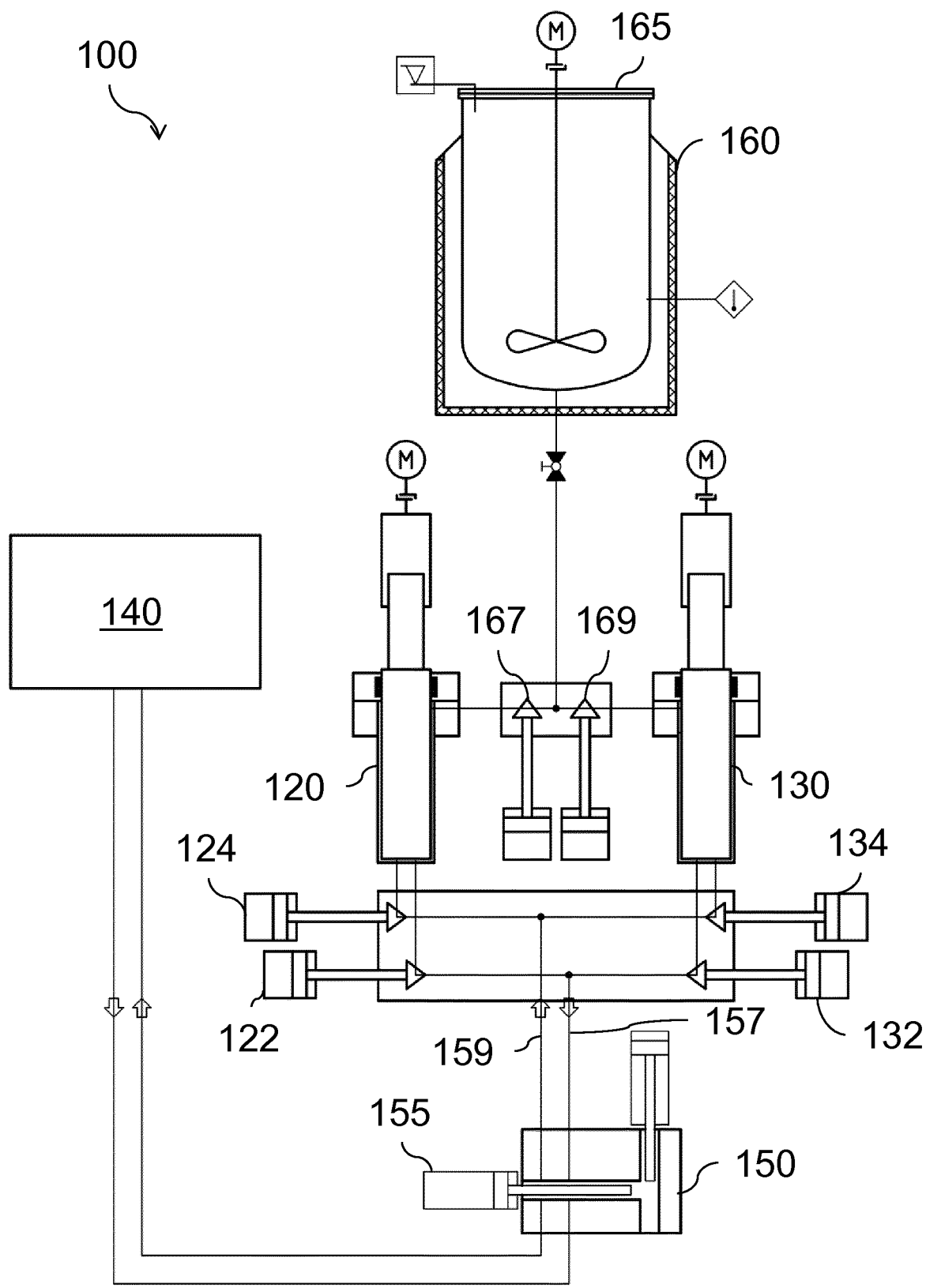
FIG. 2 a further schematic illustration of a device for the production of reaction plastics.

FIG. 2 shows the device 100 of FIG. 1 in a possible, more detailed configuration. In addition to the first metering device 110 with the first metering unit 120 and the second metering unit 130, the second metering device 140 and the mixing device 150, FIG. 2 show a dispensing device 160, from which the first mixing component can be dispensed from a storage container 165 to the first and the second metering device 120, 130, and various lines and valves of the device 100.

All or part of the valves used in the device 100 can be actively switched here by means of a control signal, e.g. electrically, pneumatically or hydraulically.

In the storage container 165 of the dispensing device 160 of the device 100 the first mixing component, e.g. a polyol to which a solid, such as expanded graphite for instance, has been added, is stored for dispensing to the first metering unit 120 and to the second metering unit 130. The first mixing component is kept in motion here by an agitator, in order to prevent a sedimentation.

The agitating takes place here such that no damage occurs to any solids contained in the first mixing component, e.g. through a corresponding adapting of the rotation rate of the agitator. For this, the agitator can be operated by means of a freely adjustable servomotor. However, any other type of agitator is also possible which permits a correspondingly "gentle" agitating. In addition to the agitator, further sensor elements can also be provided in the dispensing device 160, which measure e.g. the temperature, the viscosity or the pressure of the first mixing component.

From the storage container 165 the first mixing component can be dispensed via correspondingly configured lines selectively to containers contained in the first metering unit 120 and in the second metering unit 130. For this, valves (fifth valve 167, sixth valve 169) can be provided in the line, as shown in FIG. 2. However, any other type of flow control is also possible, which permits a selective, i.e. individual or shared, allocation of the first mixing component, such as for instance a three-way valve.

The containers of the first and second metering unit 120, 130 serve to store the first mixing component before the introduction into the mixing device 150. Here, the two containers can have filling levels which are independent of one another, which allow the first mixing component to be transferred or respectively pressed from one metering unit 120 into the other metering unit 130.

For example as illustrated schematically in FIG. 2, the first and the second metering unit 120, 130 concern respectively metering pistons, in which a piston, guided by spindle and nut by a servomotor, acts on the first mixing component situated in the container formed by the housing of the metering piston, such that a dispensing, which is metered in a controlled manner, takes place in the direction of the mixing device 150. The metering units 120, 130 can, however, also be realized by any other component suitable for brief storage and metered dispensing, with any other type of drive device.

Lines lead from the metering units 120, 130 to the mixing device 150, which allow the first mixing component to be transferred via the mixing device 150 between the metering units 120, 130. As shown in FIG. 2, each of the metering units 120, 130 can be connected to a feed line 157 to the mixing device via in each case a line which is provided with a valve (first valve 122 and third valve 132). In addition, a discharge 159 of the mixing device 150 is connected respectively to the first and the second metering unit 120, 130 via valves (second valve 124 and fourth valve 134).

The line connections between the metering units 120, 130 and the mixing device 150 are formed to be as short as possible here. For example, these elements are directly flanged on one another or are connected to one another by short pipelines. In particular, the lines are short such that they have less interior volume than one or both of the containers of the two metering units 120, 130. This prevents the unutilized standing of a not negligible quantity of the first mixing component in the lines compared to the quantity situated in the metering units 120, 130.

Prior to beginning the mixing, e.g. the first valve 122 and the fourth valve 134 are opened and the second and third valves 124, 132 are closed. A connection therefore exists via the first valve 122 from the first metering unit 120 to the mixing device 150 and a connection via the fourth valve 134 from the mixing device 150 to the second metering unit 130.

In the mixing device 150, control means are present, which prior to beginning the mixing permit a passing of the first mixing component from the feed line 157 into the discharge 159. As illustrated in FIG. 2, this can concern inter alia a control piston 155, in which a circulation groove is provided, which, when the control piston 155 is closed, connects the feed line 157 to the discharge 159. Alternatively hereto, however, the passing can also be regulated differently, e.g. by the provision of corresponding valves in a connecting line of the feed line 157 to the discharge 159 and to a mixing chamber of the mixing device 150.

It is therefore possible, prior to beginning a mixing process, to transfer the first mixing component from the first metering unit 120 via the mixing device 150 into the second metering unit. For example, with a completely filled container of the first metering unit 120 and a partly, e.g. half-filled container of the second metering unit 130, a pressing of the first mixing component out of the first metering unit 120 can thus be begun. This is then pressed via the first valve 124, the circulation groove of the control piston 155 and the fourth valve 134 into the second metering device 130. Hereby, the first mixing component arrives rapidly, i.e. within a few seconds, at the necessary operating pressure of approximately 100 bar to 200 bar. The actually required operating pressure results here from the characteristic of the mixing device 150 which is used. Depending on the mixing device 150, lower or higher pressures can also be used for the mixing.

When this is reached, the fourth valve 134 closes and the control piston 155 is opened. Thereby, on the one hand the line in the mixing device 150 leading from the feed line 157 to the discharge 159 is interrupted. On the other hand, in order to prevent a further flowing of the first mixing component into the second metering unit 130 with additional security, the line to the second metering unit 130 is prevented by closing the fourth valve 134.

With an open first valve 122 and open control piston 155, the first mixing component is mixed in a known manner in the mixing device 150, e.g. a mixing nozzle known per se, with the second mixing component provided from the second mixing device 140, and is discharged from the mixing device for the production of the reaction plastic.

When the container of the first metering unit 120 is empty, the first valve 122 is closed and the third valve 132 is opened. The second metering unit 130 therefore undertakes the dispensing of the first mixing component to the mixing device 150 from the first metering unit 120. The transition from first to second metering unit 120, 130 can also take place here in a regulated and flowing manner, in order e.g. to guarantee a constant mass flow during the entire mixing process.

During the entire mixing process, during periods of time in which the first mixing component is only dispensed from one of the two metering units 120, 130, the respectively other metering unit 120, 130 can be filled again by corresponding setting of the valves 167, 169 leading to the storage container 165. This makes it possible to operate the two metering units 120, 130 in tandem operation, whereby a quantity of reaction plastic corresponding to the quantity of first mixing component situated in the storage container 165 can be produced in one working operation.

When the working operation is ended, one of the two metering units 120, 130 can be filled so as to be full, depending on the filling level of the first mixing component in the metering units 120, 130, while the other remains only partly filled. This makes it possible to carry out again the method described above for setting correct operating parameters of the first mixing component before the start of a further mixing/production process. Owing to the symmetrical construction of the device, it is irrelevant here whether the first mixing component is dispensed first from the first or the second metering device 120,130.

As already explained above, the described device makes it possible to use the first mixing component completely for a mixing, without having to circulate it via the storage container. In particular, without circulation, an operating state of the first mixing component can be set. This permits a quality-assuring storage and processing of the first mixing component and a structural simplification of the device for the production of reaction plastics.

The device described above is suitable in particular for being used in the fully or semi-automatic plastic manufacture, e.g. on rotary table for the flexible filling of smaller moulds. For this, the first metering device 110 can be mounted with the two metering units 120, 130 together with the mixing device 150 on a robot arm 170. This has the additional advantage that, as described above, the lines between metering device 110 and mixing device 150 are short, which further contributes to the quality control. The second metering device 140 can be constructed here in a conventional manner and can feed to the mixing device 150 the second mixing component in the circulation process from a storage container situated adjacent to the robot arm. Alternatively, the second metering device 140 is also mounted on the robot arm.

FIG. 3 illustrates a schematic flow chart for a method for producing or respectively mixing a reaction plastic with a device, as was described above.

At S100 a first mixing component is guided from the first metering unit via the mixing device to the second metering unit in order, as described above, to bring the first mixing component to an operating state, in particular an operating pressure, required for the mixing.

Hereupon, at S110 the first mixing component is mixed with a second mixing component by the mixing device, as was likewise described above.

LIST OF REFERENCE NUMBERS 100 device for producing reaction plastics
110 first metering device
120 first metering unit
122 first valve
124 second valve
130 second metering unit
132 third valve
134 fourth valve
140 second metering device
150 mixing device
155 control means
157 feed line
159 discharge
160 dispensing device
165 storage container
167 fifth valve
169 sixth valve

What is claimed is:
1. A device for producing reaction plastics, comprising:
a first metering device with a first metering unit and a second metering unit, each of which is designed for receiving and dispensing a first mixing component in a metered manner;
a second metering device which is designed for receiving and dispensing a second mixing component in a metered manner; and
a mixing device, which is designed for receiving and mixing the first mixing component dispensed by the first metering unit and/or the second metering unit of the first metering device and the second mixing component dispensed by the second metering device;
wherein the first metering unit and the second metering unit are connected to the mixing device such that prior to beginning the mixing process, the first mixing component is able to be brought to an operating state required for the mixing process, by guiding the first mixing component from the first metering unit to the second metering unit via the mixing device, wherein a required operating state is a pressure, a temperature and/or a viscosity,
wherein the mixing device has control means, which are designed for preventing a mixing of the first mixing component and the second mixing component and for guiding the first mixing component here in a line from the first metering unit via the mixing device to the second metering unit,
wherein the control means are designed for enabling a mixing of the first mixing component and the second mixing component and for interrupting here the line in the mixing device leading from the first metering unit via the mixing device to the second metering unit,
wherein the control means have a control piston with a circulation groove,
wherein the control piston in a first position enables an entry of the first mixing component and of the second mixing component into a mixing chamber, and
wherein the first mixing component in a second position of the control piston can be guided via the circulation groove from the first metering unit to the second metering unit.

2. The device according to claim 1, furthermore with a dispensing device, which has a storage container and is designed for the selective feeding of the first mixing component to the first metering unit and/or to the second metering unit; wherein
the first mixing component, after it has been fed to the first metering unit and/or to the second metering unit, is mixed in the mixing device with the second mixing component, without having to be guided back into the dispensing device.

3. The device according to claim 1, wherein
the first metering unit has a first container;
the second metering unit has a second container; and
the first mixing component prior to beginning the mixing can be pressed from the first container into the second container, in order to reach the operating state.

4. The device according to claim 1, wherein:
the first metering device is designed, after the beginning of the mixing, to dispense to the mixing device the first mixing component alternately or on the fly through the first metering unit and the second metering unit.

5. The device according to claim 1, wherein
a volume of the first mixing component which can be received in the first metering unit and/or in the second metering unit, is greater than a volume of the first mixing component which can be received through lines which lead from the first metering unit and/or from the second metering unit to the mixing device.

6. The device according to claim 1, furthermore comprising: a robot arm, on which the first metering device and the mixing device are arranged.

7. A method for producing reaction plastics with a device according to claim 1, comprising the steps of:
guiding the first mixing component from the first metering unit via the mixing device to the second metering unit, in order to bring the first mixing component to an operating state required for the mixing, wherein a required operating state is a pressure, a temperature and/or a viscosity and hereupon; and
mixing the first mixing component and the second mixing component by means of the mixing device.

8. The method according to claim 7, wherein
the first mixing component has a polyol mixed with a solid, comprising at least one of expanded graphite, micro glass beads or aerogel; and
the second mixing component has an isocyanate.

9. The method according to claim 8, wherein the first mixing component comprises aerogel, wherein the aerogel comprises at least one of polyester polyol or polyether polyol.

10. A device for producing reaction plastics, comprising:
a first metering device with a first metering unit and a second metering unit, each of which is designed for receiving and dispensing a first mixing component in a metered manner;
a second metering device which is designed for receiving and dispensing a second mixing component in a metered manner; and
a mixing device, which is designed for receiving and mixing the first mixing component dispensed by the first metering unit and/or the second metering unit of the first metering device and the second mixing component dispensed by the second metering device;
wherein the first metering unit and the second metering unit are connected to the mixing device such that prior to beginning the mixing process, the first mixing component is able to be brought to an operating state required for the mixing process, by guiding the first mixing component from the first metering unit to the second metering unit via the mixing device, wherein a required operating state is a pressure, a temperature and/or a viscosity, and
wherein the first metering unit and the second metering unit have respectively a metering piston with a drive by spindle and nut, and a servomotor.

11. A device for producing reaction plastics, comprising:
a first metering device with a first metering unit and a second metering unit, each of which is designed for receiving and dispensing a first mixing component in a metered manner;
a second metering device which is designed for receiving and dispensing a second mixing component in a metered manner; and
a mixing device, which is designed for receiving and mixing the first mixing component dispensed by the first metering unit and/or the second metering unit of the first metering device and the second mixing component dispensed by the second metering device;
wherein the first metering unit and the second metering unit are connected to the mixing device such that prior to beginning the mixing process, the first mixing component is able to be brought to an operating state required for the mixing process, by guiding the first mixing component from the first metering unit to the second metering unit via the mixing device, wherein a required operating state is a pressure, a temperature and/or a viscosity,
wherein the mixing device has a feed line for feeding the first mixing component into the mixing device, and a discharge for discharging the first mixing component out of the mixing device,
wherein the first metering unit is connected to the feed line via a first valve and to the discharge via a second valve,
wherein the second metering unit is connected to the feed line via a third valve and to the discharge via a fourth valve, and
wherein the valves can be opened and closed independently of one another.

\* \* \* \* \*